United States Patent
Takizawa et al.

(10) Patent No.: US 9,156,186 B2
(45) Date of Patent: Oct. 13, 2015

(54) METHOD FOR PRODUCING CONCRETE FORMED BODY

(75) Inventors: Tsutomu Takizawa, Tokyo (JP); Hiroki Maeda, Tokyo (JP)

(73) Assignee: SE CORPORATION, Tokyo (JP)

( * ) Notice: Subject to any disclaimer, the term of this patent is extended or adjusted under 35 U.S.C. 154(b) by 0 days.

(21) Appl. No.: 14/396,246

(22) PCT Filed: Aug. 7, 2012

(86) PCT No.: PCT/JP2012/070086
§ 371 (c)(1),
(2), (4) Date: Oct. 22, 2014

(87) PCT Pub. No.: WO2014/024259
PCT Pub. Date: Feb. 13, 2014

(65) Prior Publication Data
US 2015/0141552 A1 May 21, 2015

(51) Int. Cl.
| B28B 1/14 | (2006.01) |
| C04B 22/06 | (2006.01) |
| C04B 28/02 | (2006.01) |
| C04B 14/38 | (2006.01) |

(Continued)

(52) U.S. Cl.
CPC . B28B 1/14 (2013.01); B28B 1/082 (2013.01); B28B 7/44 (2013.01); B28B 11/241 (2013.01); B28B 17/02 (2013.01); B28B 23/0006 (2013.01); C04B 14/38 (2013.01); C04B 14/386 (2013.01); C04B 16/06 (2013.01); C04B 20/0048 (2013.01); C04B 20/02 (2013.01); C04B 22/06 (2013.01); C04B 28/02 (2013.01); C04B 40/0089 (2013.01)

(58) Field of Classification Search
CPC .. C04B 14/386; C04B 16/06; C04B 20/0048; C04B 20/02; C04B 40/0089; B28B 1/14; B28B 17/02
USPC .......................................................... 524/2
See application file for complete search history.

(56) References Cited

U.S. PATENT DOCUMENTS 5,308,696 A * 5/1994 Hanashita et al. ............ 428/357

FOREIGN PATENT DOCUMENTS

| JP | 62-134221 | 6/1987 |
| JP | 63-247008 | 10/1988 |

(Continued)

OTHER PUBLICATIONS

Machine translation of JP 2009-006541. Jan. 2009.*

(Continued)

*Primary Examiner* — John Uselding
(74) *Attorney, Agent, or Firm* — Wenderoth, Lind & Ponack, L.L.P.

(57) ABSTRACT

A problem is to provide a production method by which a high-strength concrete formed body can be obtained. The problem can be solved by a method for producing a concrete formed body including a defoaming step [1] of holding a concrete composition having a water-cement ratio adjusted to from 14 to 20%, in a reduced pressure atmosphere to obtain a defoamed concrete; a defoaming step [2] of holding a carbon fiber immersed in a cement solution having a water-cement ratio adjusted to 14% or more, in a reduced pressure atmosphere to obtain a defoamed fiber; and a forming step of placing the defoamed concrete and the defoamed fiber within a shuttering, followed by curing to obtain a high-strength concrete formed body.

7 Claims, 6 Drawing Sheets

(51) Int. Cl.
  *C04B 16/06* (2006.01)
  *B28B 7/44* (2006.01)
  *B28B 1/08* (2006.01)
  *B28B 11/24* (2006.01)
  *B28B 23/00* (2006.01)
  *B28B 17/02* (2006.01)
  *C04B 20/00* (2006.01)
  *C04B 20/02* (2006.01)
  *C04B 40/00* (2006.01)

(56) References Cited

FOREIGN PATENT DOCUMENTS

| JP | 01-244808 | 9/1989 |
| JP | 04-309663 | 11/1992 |
| JP | 05-105545 | 4/1993 |
| JP | 2003-062826 | 3/2003 |
| JP | 2009-006541 | 1/2009 |

OTHER PUBLICATIONS

International Search Report issued Oct. 30, 2012 in International (PCT) Application No. PCT/JP2012/070086 with English translation.

Written Opinion of the International Searching Authority issued Oct. 30, 2012 in International (PCT) Application No. PCT/JP2012/070086 with English translation.

\* cited by examiner

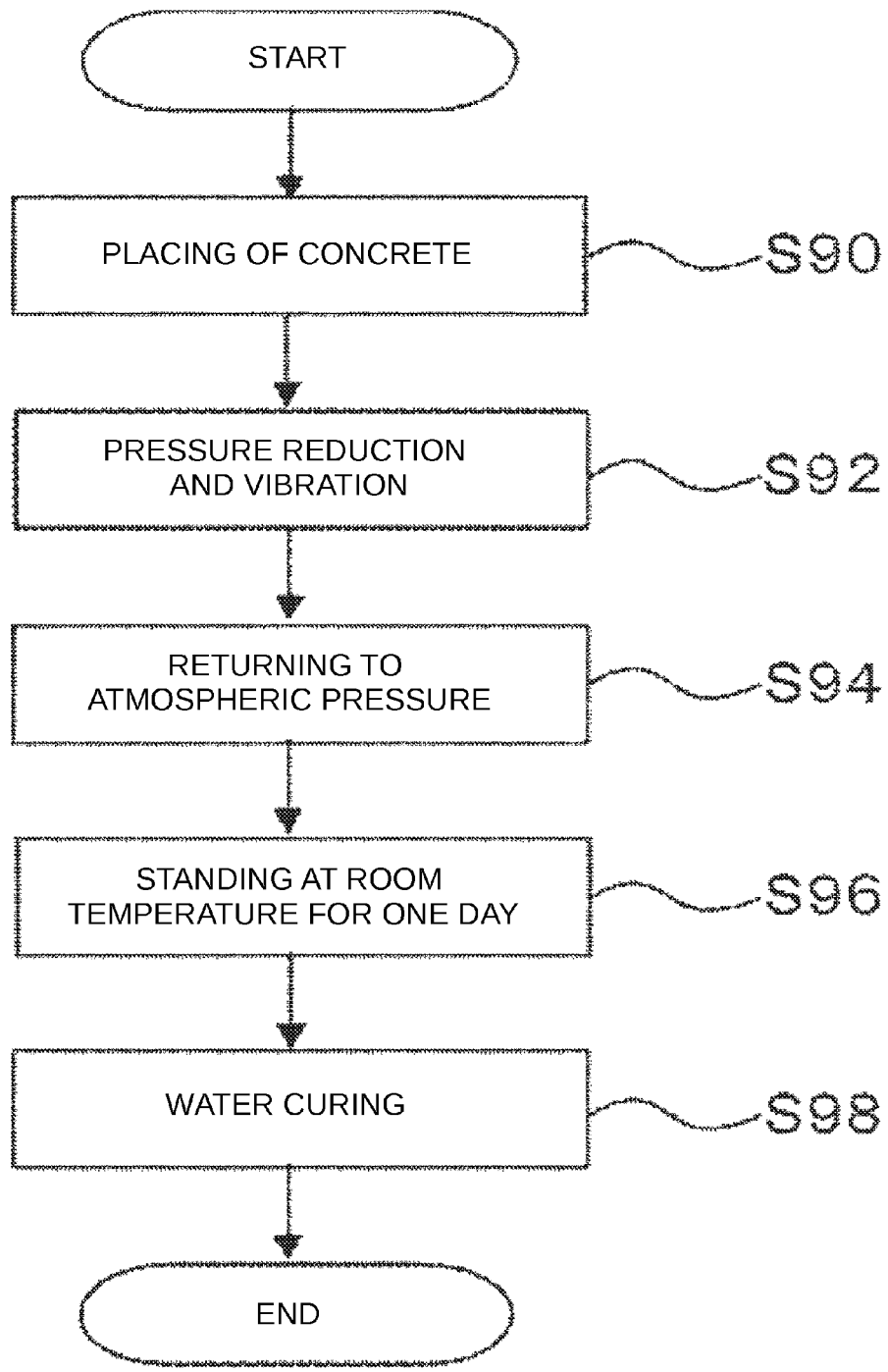

METHOD FOR PRODUCING CONCRETE FORMED BODY

This Application is a U.S. National Stage Application of International (PCT) Application No. PCT/JP2012/070086 filed Aug. 7, 2012.

TECHNICAL FIELD

The present invention relates to a method for producing a concrete formed body.

BACKGROUND ART

A number of methods have been conventionally proposed for the purpose of obtaining a high-strength concrete formed body.

For example, PTL 1 describes a concrete placing method which is characterized by constructing a formwork with a shuttering having a dehydrating/deaerating sheet stuck onto a surface of a sheathing board, placing a concrete within the formwork of the shuttering such that the dehydrating/deaerating sheet-stuck surface is arranged inward, and then forming a reduced pressure state in the inside of the dehydrating/deaerating sheet.

In addition, for example, PTL 2 describes a vacuum deaeration treatment method of a lightweight foamed concrete by putting a mortar foamed body in a closed vessel and reducing the pressure to not more than a saturated steam pressure at a temperature of the foamed body, thereby evaporating the moisture, before the mortar foamed body is subjected to high-pressure steam curing to produce a lightweight foamed concrete, which is characterized by setting up an end point of the vacuum deaeration treatment while making the amount of moisture evaporated from the foamed body as a barometer.

CITATION LIST

Patent Literature

PTL 1: JP 4-309663 A
PTL 2: JP 5-105545 A

SUMMARY OF INVENTION

Technical Problem

However, the present inventor found that a concrete formed body having sufficiently high strength is hardly obtained according to the conventional methods described in PTLs 1 to 2.

An object of the present invention is to provide a production method by which a concrete formed body having higher strength than that in the conventional techniques can be obtained.

Solution to Problem

The present inventor made extensive and intensive investigations regarding any cause for which a concrete formed body having sufficiently high strength is hardly obtained according to the conventional techniques, and as a result, he has accomplished the present invention.

The present invention is concerned with the following (1) to (34).

(1) A method for producing a concrete formed body comprising a defoaming step [1] of holding a concrete composition having a water-cement ratio adjusted to from 14 to 20%, in a reduced pressure atmosphere to obtain a defoamed concrete;

a defoaming step [2] of holding a carbon fiber immersed in a cement solution having a water-cement ratio adjusted to 14% or more, in a reduced pressure atmosphere to obtain a defoamed fiber; and a forming step of placing the defoamed concrete and the defoamed fiber within a shuttering, followed by curing to obtain a high-strength concrete formed body.

(2) The method for producing a concrete formed body as set forth above in (1), wherein the concrete composition further contains an organic synthetic fiber.

(3) The method for producing a concrete formed body as set forth above in (1) or (2), wherein the carbon fiber does not have a water-repellent organic material on a surface thereof.

(4) The method for producing a concrete formed body as set forth above in any one of (1) to (3), wherein the concrete composition contains a chemical admixture and a mineral admixture.

(5) The method for producing a concrete formed body as set forth above in any one of (1) to (4), wherein a length of the carbon fiber is 30 mm or more.

(6) The method for producing a concrete formed body as set forth above in any one of (1) to (5), wherein in the defoaming step [2], the carbon fiber is in a form of sheet-like woven fabric.

(7) The method for producing a concrete formed body as set forth above in any one of (1) to (6), wherein the defoaming step [1] is a step of determining an irradiation time of a microwave on the basis of the water-cement ratio at the time of fabricating the concrete composition and irradiating the concrete composition in the reduced pressure atmosphere with a microwave for the irradiation time to obtain the defoamed concrete.

(8) The method for producing a concrete formed body as set forth above in (7), wherein in the defoaming step [1], after rendering the atmosphere in a reduced pressure state, a first prescribed time lapses, and thereafter, the irradiation with a microwave is started.

(9) The method for producing a concrete formed body as set forth above in (7) or (8), wherein in the defoaming step [1], after the irradiation with a microwave, the reduced pressure state is held for a second prescribed time.

(10) The method for producing a concrete formed body as set forth above in any one of (1) to (9), wherein at the time of rendering the atmosphere in a reduced pressure state and/or the time of the irradiation with a microwave, the concrete composition is vibrated.

(11) The method for producing a concrete formed body as set forth above in (10), wherein the vibration is performed by using a vibration generator.

(12) The method for producing a concrete formed body as set forth above in (10), wherein the vibration is performed by using an ultrasonic vibrator.

(13) A concrete formed body produced by the method for producing a concrete formed body as set forth above in any one of (1) to (12).

(14) A method for producing a concrete formed body by fabricating a concrete composition, which is then placed within a shuttering and solidified to obtain a high-strength concrete formed body, the method comprising determining an irradiation time of a microwave on the basis of a water-cement ratio at the time of fabricating the concrete composition; and after placing the concrete composition within a shuttering, rendering an atmosphere where the concrete composition exists, in a reduced pressure state and irradiating the concrete composition with a microwave for the irradiation time.

(15) The method for producing a concrete formed body as set forth above in (14), wherein after rendering the atmosphere in a reduced pressure state, a first prescribed time lapses, and thereafter, the irradiation with a microwave is started.

(16) The method for producing a concrete formed body as set forth above in (14) or (15), wherein after the irradiation with a microwave, the reduced pressure state is held for a second prescribed time.

(17) The method for producing a concrete formed body as set forth above in any one of (14) to (16), wherein the irradiation time is determined such that the water-cement ratio of the concrete composition after the irradiation with a microwave is not more than 20%.

(18) The method for producing a concrete formed body as set forth above in any one of (14) to (17), wherein at the time of rendering the atmosphere in a reduced pressure state and/or the time of the irradiation with a microwave, the placed concrete composition is vibrated.

(19) The method for producing a concrete formed body as set forth above in (18), wherein the vibration is performed by using a vibration generator.

(20) The method for producing a concrete formed body as set forth above in (18), wherein the vibration is performed by using an ultrasonic vibrator.

(21) The method for producing a concrete formed body as set forth above in any one of (14) to (20), wherein the concrete composition is a concrete composition not containing a water reducing agent.

(22) A method for producing a concrete formed body by placing a concrete composition within a shuttering and solidifying it to obtain a high-strength concrete formed body, the method comprising after placing the concrete composition within a shuttering, rendering an atmosphere where the concrete composition exists, in a reduced pressure state and irradiating the concrete composition with a microwave while controlling a moisture concentration on a surface of the concrete composition to a fixed value or more.

(23) The method for producing a concrete formed body as set forth above in (22), wherein the moisture concentration on a surface of the concrete composition is controlled to 15% by mass or more.

(24) The method for producing a concrete formed body as set forth above in (22) or (23), wherein a surface resistivity value of the concrete composition is measured, thereby controlling the moisture concentration on a surface of the concrete composition to a fixed value or more.

(25) The method for producing a concrete formed body as set forth above in (24), wherein the moisture concentration on a surface of the concrete composition is controlled to a fixed value or more by controlling the surface resistivity value of the concrete composition to not more than 40 kΩ/sq.

(26) A concrete formed body produced by the method for producing a concrete formed body as set forth above in any one of (14) to (25).

(27) An apparatus for producing a concrete formed body comprising a shuttering within which a concrete composition is placed;
a closed vessel capable of including the shuttering in the inside thereof;

a pressure reducer for rendering the inside of the closed vessel in a reduced pressure state; and a microwave generator for irradiating the concrete composition placed within the shuttering with a microwave, the apparatus being capable of performing the method for producing a concrete formed body as set forth above in any one of (14) to (25).

(28) A method for producing a concrete formed body comprising fabricating a concrete composition; then placing it within a shuttering; rendering an atmosphere where the concrete composition exists, in a reduced pressure state for a prescribed time; decreasing the amount of moisture contained in the concrete composition to lower a water-cement ratio of the concrete composition, thereby obtaining a high-strength concrete formed body.

(29) The method for producing a concrete formed body as set forth above in (28), wherein on the occasion of rendering the atmosphere in a reduced pressure state, the placed concrete composition is vibrated.

(30) The method for producing a concrete formed body as set forth above in (29), wherein the vibration is performed by using a vibration generator.

(31) The method for producing a concrete formed body as set forth above in (29), wherein the vibration is performed by using an ultrasonic vibrator.

(32) The method for producing a concrete formed body as set forth above in any one of (28) to (31), wherein the concrete composition is a concrete composition not containing a water reducing agent.

(33) A concrete formed body produced by the method for producing a concrete formed body as set forth above in any one of (28) to (32).

(34) An apparatus for producing a concrete formed body comprising a shuttering within which a concrete composition is placed;
a closed vessel capable of including the shuttering in the inside thereof; and a pressure reducer for rendering the inside of the closed vessel in a reduced pressure state, the apparatus being capable of performing the method for producing a concrete formed body as set forth above in any one of (28) to (32).

Advantageous Effects of Invention

According to the present invention, it is possible to provide a production method by which a concrete formed body having higher strength than that in the conventional techniques can be obtained.

BRIEF DESCRIPTION OF DRAWINGS

FIG. 7 is a flow chart showing operation procedures in the Examples of the third production method of the present invention.

DESCRIPTION OF EMBODIMENTS

Figure 1:
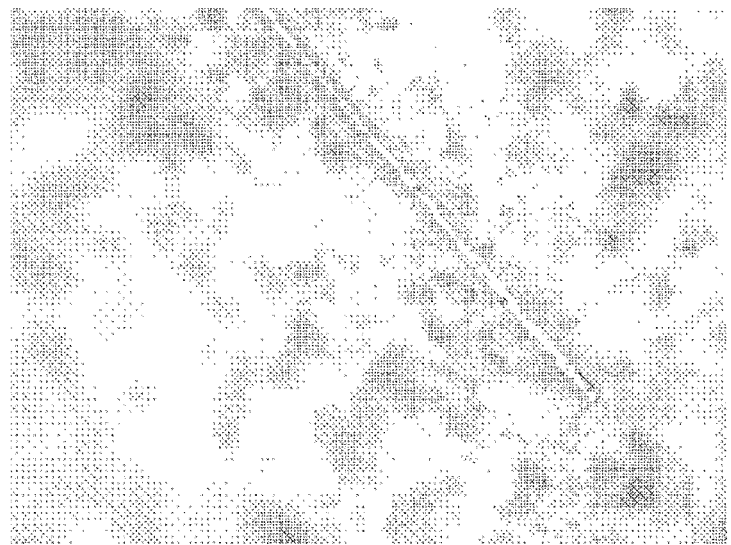
FIG. 1 is an enlarged cross-sectional photograph of a concrete formed body obtained by a first production method of the present invention.

The present invention is described.

The present invention includes the following three embodiments.

A first embodiment of the present invention is concerned with a method for producing a concrete formed body comprising a defoaming step [1] of holding a concrete composition having a water-cement ratio adjusted to from 14 to 20%, in a reduced pressure atmosphere to obtain a defoamed concrete; a defoaming step [2] of holding a carbon fiber immersed in a cement solution having a water-cement ratio adjusted to 14% or more, in a reduced pressure atmosphere to obtain a defoamed fiber; and a forming step of placing the defoamed concrete and the defoamed fiber within a shuttering, followed by curing to obtain a high-strength concrete formed body.

Such a method for producing a concrete formed body is hereinafter also referred to as "first production method of the present invention".

According to the first production method of the present invention, it is possible to obtain a concrete formed body having higher flexural strength than that in the conventional techniques. Such a formed body is high in the strength even when a steel material is not used, and in the case of not using a steel material, corrosion of steel materials due to a salt or the like invaded from the outside is not caused, and therefore, the formed body is also excellent in durability.

A second embodiment of the present invention is concerned with a method for producing a concrete formed body by fabricating a concrete composition, which is then placed within a shuttering and solidified to obtain a high-strength concrete formed body, the method comprising determining an irradiation time of a microwave on the basis of a water-cement ratio at the time of fabricating the concrete composition; and after placing the concrete composition within a shuttering, rendering an atmosphere where the concrete composition exists, in a reduced pressure state and irradiating the concrete composition with a microwave for the irradiation time.

Such a method for producing a concrete formed body is hereinafter also referred to as "second production method of the present invention".

The present inventor made extensive and intensive investigations regarding any cause for which a concrete formed body having sufficiently high strength is hardly obtained within a short period of time according to the conventional techniques.

Then, he has found that the foregoing is caused due to the fact that in a process in which a concrete composition hardens little by little, hardening uniformly starts, and a channel of moisture movement is clogged by hardening, and therefore, in the case of irradiating the concrete with a microwave, the moisture or air bubbles in the inside thereof hardly come out to the outside with a lapse of time.

In addition, in the conventional method, the irradiation with a microwave is adopted for the purpose of heating a concrete formed body, and by increasing the temperature of the concrete formed body, hardening of the concrete is promoted. However, since the irradiation with a microwave according to the second production method of the present invention is performed in a reduced pressure state, the boiling point of the moisture in the placed concrete composition is lowered, and before the temperature of the concrete composition increases, the moisture evaporates. In consequence, in the subject concrete composition, the water-cement ratio can be lowered without being accompanied by a temperature increase.

According to the second production method of the present invention, it is possible to provide a production method in which a high-strength concrete formed body having a small water-cement ratio and not substantially containing air bubbles is easily obtained as compared with the conventional techniques.

A third embodiment of the present invention is concerned with a method for producing a concrete formed body comprising fabricating a concrete composition; then placing it within a shuttering; rendering an atmosphere where the concrete composition exists, in a reduced pressure state; decreasing the amount of moisture contained in the concrete composition; and lowering a water-cement ratio of the concrete composition, thereby obtaining a high-strength concrete formed body.

Such a method for producing a concrete formed body is hereinafter also referred to as "third production method of the present invention".

In the third production method of the present invention, by rendering the atmosphere where the concrete composition exists, in a reduced pressure state, it is possible to decrease the air bubbles along with the amount of moisture.

According to the third production method of the present invention, it is possible to provide a production method in which a high-strength concrete formed body having a small water-cement ratio and not substantially containing air bubbles is easily obtained as compared with the conventional techniques.

In the following, it should be construed that in the case of describing simply "production method of the present invention", all of the first production method of the present invention, the second production method of the present invention, and the third production method of the present invention are meant.

<Concrete Composition>

First of all, the concrete composition which is used in the production method of the present invention is described.

It should be construed that in the production method of the present invention, the concrete composition means an unhardened mixture containing at least a cement and water. In consequence, in the present invention, the concrete composition may include general mortars and cement pastes.

In the production method of the present invention, the concrete composition contains a cement and water, and besides, it may further contain an aggregate, a mineral admixture, and a chemical admixture. In addition, it is preferable that the concrete composition contains a silica fume as the mineral admixture.

It is preferable the concrete composition in the first production method of the present invention contains the mineral admixture and the chemical admixture.

Here, the cement is not particularly limited, for example, conventionally known cements can be used, and for example, a Portland cement can be used. Specifically, for example, an ordinary Portland cement, a high-early-strength Portland cement, a Portland blast-furnace slag cement, a low-heat Portland cement, a moderate-heat Portland cement, and the like can be used.

The water is not particularly limited, too, and for example, tap water, ion-exchanged water, pure water, and the like can be used.

The aggregate is not particularly limited, too; for example, conventionally known aggregates can be used; and for example, a fine aggregate and a coarse aggregate can be used.

As the fine aggregate, land sand, river sand, crushed sand, sea sand, silica sand, a slag fine aggregate, a lightweight fine aggregate, a heavy-weight fine aggregate, a recycled fine aggregate, and a mixed fine aggregate thereof can be used.

As the coarse aggregate, river gravel, pit gravel, sea gravel, rubble, a slag coarse aggregate, a lightweight coarse aggregate, a heavy-weight coarse aggregate, a recycled coarse aggregate, and a mixed coarse aggregate thereof can be used.

The mineral admixture and the chemical admixture are not particularly limited, too; for example, conventionally known admixtures can be used; and for example, a mineral admixture (solid) such as a blast-furnace slag fine powder, a fly ash, a silica fume, a limestone fine powder, a high-early-strength expansive additive, etc. can be used. In addition, a chemical admixture (liquid) such as a water reducing agent, an air entraining agent, an antifoaming agent, a defoaming agent, a foaming agent, a thickening agent, a rust preventive, a pigment, etc. may also be mixed within the range where the strength or workability is not impaired. In order to enhance the strength, a fiber of a metal or the like may further be mixed.

By mixing such cement and water and optionally an aggregate, a mineral admixture, a chemical admixture, or the like as the need arises, it is possible to obtain the concrete composition.

On the occasion of obtaining the concrete composition which is used in the first production method of the present invention, a mixing ratio of water and the cement is adjusted such that the water-cement ratio is from 14 to 20%. Here, the water-cement ratio is more preferably not more than 19%, and still more preferably not more than 18%. In addition, the water-cement ratio is preferably 15% or more, more preferably 16% or more, and still more preferably 17% or more.

This is because when the water-cement ratio falls within such a range, the compression strength, flexural strength, or tensile strength of the concrete formed body obtained by the first production method of the present invention tends to become higher.

The concrete composition which is used in the second production method of the present invention or the third production method of the present invention can be obtained by, for example, mixing water and the cement such that the water-cement ratio is not more than 40%, preferably not more than 20%, and more preferably not more than 17%. It is to be noted that in the case of using a cement for ultra-high strength concrete, such as a silica fume cement (SFC) using a low-heat Portland cement, etc., the water-cement ratio can also be made to be not more than 15%.

In the production method of the present invention, the water-cement ratio means a percentage of a mass ratio of water and the chemical admixture to the cement [{(mass of water)+(mass of chemical admixture)}/(mass of cement)×100].

In the concrete composition in the first production method of the present invention, a content ratio of the aggregate is preferably from 20% to 80%, more preferably from 30% to 70%, still more preferably from 40% to 60%, and yet still more preferably about 50% in terms of a mass ratio relative to a total mass of the cement and the mineral admixture [(mass of aggregate)/{(mass of cement)+(mass of mineral admixture)}×100].

In the concrete composition in the second production method of the present invention or the third production method of the present invention, a content ratio of the aggregate can be made to be 0% in the case of a cement paste, about 40% in the case of a mortar, and about 70% in the case of a concrete, respectively in terms of a volume ratio [{(coarse aggregate)+(fine aggregate)}/(total volume)×100]. In addition, in the case of a concrete, a mass ratio relative to the cement [cement/{(coarse aggregate)+(fine aggregate)}×100] can be made to be about 15%.

In the concrete composition in the first production method of the present invention, a content ratio of the mineral admixture is preferably from 1% to 30%, more preferably from 5% to 15%, still more preferably from 8% to 12%, and yet still more preferably about 10% in terms of a mass ratio to a mass of the cement {(mass of mineral admixture)/(mass of cement)×100}.

In the concrete composition in the second production method of the present invention or the third production method of the present invention, a content ratio of the mineral admixture can be made to be from about 0.1% to about 10% in terms of a mass ratio {(mass of mineral admixture)/(total mass)×100}. In addition, in the case of using a reinforcing fiber, the content ratio of the mineral admixture can be made to be about 10%.

In the concrete composition in the first production method of the present invention, a content ratio of the chemical admixture is preferably from 0.1 to 5%, more preferably from 0.5 to 4%, still more preferably from 1 to 3%, and yet still more preferably about 2% in terms of a mass ratio to a total mass of the cement and the mineral admixture [(mass of chemical admixture)/{(mass of cement)+(mass of mineral admixture)}×100].

In the concrete composition in the second production method of the present invention or the third production method of the present invention, a content ratio of the chemical admixture is preferably from 0.1 to 5%, more preferably from 0.5 to 4%, still more preferably from 1 to 3%, and yet still more preferably about 2% in terms of a mass ratio to a total mass of the cement and the mineral admixture [(mass of chemical admixture)/[{(mass of cement)+(mass of mineral admixture)}×100].

In the first production method of the present invention, it is preferable that the concrete composition contains a water reducing agent as the chemical admixture. This is because the amount of moisture can be decreased while keeping the fluidity of the concrete composition, and the tensile strength of the obtained concrete formed body tends to become higher.

In the second production method of the present invention or the third production method of the present invention, on the occasion of placing the concrete composition within a shuttering, a water reducing agent can be used as the chemical admixture for the purpose of decreasing the amount of moisture and air bubbles while keeping the fluidity. In the case of not using a water reducing agent, it is preferable to make the water-cement ratio to be about 40%; however, by using a water reducing agent, it is possible to use a concrete composition in which the water-cement ratio is previously made to be not more than 20% or not more than 17%. It is to be noted that in the case of not using a water reducing agent, by prolonging a holding time in a reduced pressure state as described later, after placing within a shuttering, the water-cement ratio of the concrete composition can also be made to be not more than 20% or not more than 17%. It is to be noted that in the case of using the above-described cement for ultra-high strength concrete, the water-cement ratio can also be made to be not more than 15%.

It is preferable that the concrete composition in the first production method of the present invention further contains an organic synthetic fiber.

Examples of the organic synthetic fiber include a PVA (polyvinyl alcohol) fiber, PP (polypropylene), and the like.

It is to be noted that the carbon fiber which is used in the first production method of the present invention is not included in the organic synthetic fiber.

The subject organic synthetic fiber is easily stretched as compared with the carbon fiber or the concrete, and therefore, when the concrete composition contains the organic synthetic fiber, even if a crack is generated in the concrete formed body obtained by the first production method of the present invention, it is possible to suppress expansion of the crack. In addition, the strength of the concrete formed body after yield increases, thereby making it possible to prevent spalling at the time of rupture.

In the concrete composition in the first production method of the present invention, a content ratio of the organic synthetic fiber is preferably from 0.1 to 5%, more preferably from 0.3 to 3%, still more preferably from 0.5 to 2%, and yet still more preferably about 1% in terms of a mass ratio to a total mass of the cement and the mineral admixture [(organic synthetic fiber)/{(mass of cement)+(mass of mineral admixture)}×100].

<First Production Method of the Present Invention>

Each of the steps provided in the first production method of the present invention is described.

[Defoaming Step [1]]

In the first production method of the present invention, the defoaming step [1] is a step of holding a concrete composition having a water-cement ratio adjusted to from 14 to 20%, in a reduced pressure atmosphere to obtain a defoamed concrete.

In the defoaming step [1], the concrete composition obtained by adjusting the water-cement ratio within a prescribed range and mixing is held in a reduced pressure atmosphere.

For example, the concrete composition obtained by adjusting the water-cement ratio within a prescribed range and then mixing by using a kneading machine or the like is charged into a container of a desired mode. Then, the container having the concrete composition charged therein is put in a closed vessel, and the inside of the closed vessel is subjected to pressure reduction by using a pressure reducer (e.g., a pressure reducing pump, etc.), thereby making it possible to hold the concrete composition in a reduced pressure atmosphere.

Although a time for holding the concrete composition in a reduced pressure atmosphere is not particularly limited, it is preferably from 3 to 30 minutes, more preferably from 10 to 20 minutes, and still more preferably about 15 minutes.

Although a degree of pressure reduction of the reduced pressure atmosphere is not particularly limited, it is preferably from 5 to 60 Torr, more preferably from 5 to 40 Torr, and still more preferably from 5 to 30 Torr.

When the concrete composition is held in the reduced pressure atmosphere, a boiling point of water is lowered, and the moisture in the concrete composition is converted into a steam, whereby the moisture is released from the concrete composition. In addition, air bubbles containing the moisture are released from the inside to the outside of the concrete. As a result, the moisture in the concrete is decreased.

In addition, it is preferable to give vibrations to the concrete composition in the reduced pressure atmosphere. For example, by installing a vibrator in a closed vessel, installing thereon a container having the concrete composition charged therein, and actuating the vibrator, it is possible to apply vibrations. When vibrations are applied to the concrete composition, the release of air bubbles from the inside of the concrete composition is promoted.

Here, as the vibrator, a vibration generator or an ultrasonic vibrator can be used.

In addition, by rendering the atmosphere in a reduced pressure state while controlling such that the moisture of a surface portion of the concrete composition in the reduced pressure atmosphere is a fixed value or more, it is possible to efficiently remove the moisture in the inside of the concrete composition so as not to disturb the release of air bubbles from the inside of the concrete composition.

By controlling the moisture concentration of the surface portion of the concrete composition, the moisture concentration is made to be preferably 15% by mass or more, more preferably 14% by mass or more, still more preferably 13% by mass or more, and yet still more preferably 12% by mass or more. This is because the moisture in the inside of the concrete composition can be efficiently removed.

For example, by measuring a surface resistivity value of the concrete composition in the reduced pressure atmosphere, it is possible to control the moisture concentration on the surface of the concrete composition such that it is a fixed value or more. Specifically, by controlling the concrete composition such that the surface resistivity value of the concrete composition is not more than 40 kΩ/sq, it is possible to control the moisture concentration on the surface of the concrete composition to a fixed value or more. This surface resistivity value is preferably not more than 35 kΩ/sq, more preferably not more than 30 kΩ/sq, still more preferably not more than 25 kΩ/sq, and yet still more preferably not more than 20 kΩ/sq.

As described previously, in the case where the moisture concentration of the subject portion is controlled by measuring the resistivity value on the surface of the concrete composition in the reduced pressure atmosphere, or other means, whereby the moisture concentration becomes smaller than the prescribed value, the surface portion of the concrete composition, or the like may be stirred.

In the case where the moisture concentration becomes smaller than the prescribed value, moisture may be applied to the surface portion of the concrete composition by using an atomizer or the like.

The defoaming step [1] is preferably a step of determining an irradiation time of a microwave on the basis of the water-cement ratio at the time of fabricating the concrete composition and irradiating the concrete composition in the reduced pressure atmosphere with a microwave for the irradiation time to obtain the defoamed concrete.

That is, the defoaming step [1] is preferably a step of determining an irradiation time of a microwave on the basis of the water-cement ratio at the time of fabricating the concrete composition having a water-cement ratio adjusted to from 14 to 20%, holding the concrete composition in the reduced pressure atmosphere, and irradiating the concrete composition in the reduced pressure atmosphere with a microwave for the irradiation time to obtain the defoamed concrete.

An irradiation time t (s) of the microwave can be determined from a mass Wam (g) of water Wa (also including the moisture of a water reducing agent or the like) used for fabricating the concrete composition, a mass Wbm (g) of water Wb determined from the targeted water-cement ratio, an evaporation heat (40.8 kJ/mole) of water, 18 g as a mass of one mole of water, an output P (W) of a microwave generator, and an efficiency η of the microwave (it can be made to be from 0.6 to 0.7, and preferably 0.65 (in the case of a concrete)) according to the following equation (I).

$$t = ((Wam - Wbm) \times 40800/18)/(P \times \eta) \qquad \text{Equation (I)}$$

The irradiation time t of the microwave is determined on the basis of the water-cement at the time of fabrication of the concrete composition according to such an equation (I). Then, as described previously, it is preferable that after holding the concrete composition in a reduced pressure atmosphere, the concrete composition in the reduced pressure atmosphere is irradiated with a microwave for the irradiation time t determined according to the foregoing equation (I).

In addition, it is preferable that the concrete composition is held in a reduced pressure atmosphere for a first prescribed time (for example, from about 3 minutes to 20 minutes, preferably from 3 minutes to 10 minutes, and more preferably from 3 minutes to 5 minutes) and then irradiated with a microwave for the irradiation time t determined according to the foregoing equation (I).

When the concrete composition is irradiated with a microwave in a reduced pressure atmosphere, the moisture is released from the concrete composition. In addition, air bubbles containing the moisture are released from the inside to the outside of the concrete composition. As a result, the moisture in the concrete composition is decreased.

Here, a frequency of the microwave is not particularly limited, and for example, a microwave having a frequency of from 900 to 2,500 MHz and an output of from 100 W to 30 kW can be used.

In addition, it is preferable to apply vibrations to the container having the concrete composition charged therein, or the like while irradiating the concrete composition with a microwave. A method for applying vibrations can be made the same as that described above.

In addition, by irradiating the concrete composition with a microwave while more minutely controlling the amount of moisture of the concrete composition, specifically controlling such that the moisture of the surface portion of the concrete composition is a fixed value or more, the moisture in the inside of the concrete may be efficiently removed so as not to disturb the release of air bubbles from the inside of the concrete composition.

As described previously, by controlling the moisture concentration of the surface portion of the concrete composition while irradiating the concrete composition with a microwave, the moisture concentration is made to be preferably 15% by mass or more, more preferably 14% by mass or more, still more preferably 13% by mass or more, and yet still more preferably 12% by mass or more. This is because the moisture in the inside of the concrete composition can be efficiently removed.

Similar to the foregoing, for example, by measuring a surface resistivity value of the concrete composition, it is possible to control the concrete composition such that the moisture concentration on the surface of the concrete composition is a fixed value or more.

As described previously, in the case where the moisture concentration of the subject portion is controlled by measuring the resistivity value on the surface of the concrete composition, or other means, whereby the moisture concentration becomes smaller than the prescribed value, the surface portion of the concrete composition, or the like may be stirred in the same manner as that described above.

After the irradiation time t has elapsed, the irradiation with a microwave may be stopped, and at the same time, the vibration and the pressure reduction may be stopped. Here, after stopping the irradiation with a microwave, the reduced pressure state may be held for a second prescribed time (for example, from about 2 minutes to 5 minutes, and preferably from 3 minutes to 5 minutes) preferably while continuing the vibration and the pressure reduction.

In this way, in the case of irradiating the concrete composition with a microwave, the defoaming step [1] can be performed by using an apparatus of a mode shown in FIG. 4, which can be used in the second production method of the present invention as described later.

According to such a defoaming step [1], a defoamed concrete can be obtained.

[Defoaming Step (2)]

In the first production method of the present invention, the defoaming step [2] is a step of holding a carbon fiber immersed in a cement solution having a water-cement ratio adjusted to 14% or more, in a reduced pressure atmosphere to obtain a defoamed fiber.

The cement solution which is used in the defoaming step [2] can be obtained by using the cement and water contained in the concrete composition and mixing them such that the water-cement ratio is 14% or more.

The water-cement ratio in the cement solution is preferably 20% or more, more preferably 25% or more, still more preferably 30% or more, yet still more preferably 35% or more, even yet still more preferably 40% or more, and even still more preferably 45% or more. In addition, the water-cement ratio is preferably not more than 70%, more preferably not more than 60%, still more preferably not more than 50%, yet still more preferably not more than 40%, and even yet still more preferably not more than 30%.

This is because when the water-cement ratio in the cement solution falls within such a range, the flexural strength of the concrete formed body obtained by the first production method of the present invention tends to become higher.

The cement solution contains the cement and water and may further contain other materials. For example, the cement solution may contain the aggregate, the mineral admixture, and the chemical admixture, each of which may be contained in the concrete composition.

In the cement solution, a total content of the cement and water is preferably 70% by mass or more, more preferably 80% by mass or more, still more preferably 90% by mass or more, and yet still more preferably 95% by mass or more. In addition, it is preferable that the cement solution is substantially composed of a cement, a silica fume, and water.

In the defoaming step [2], a carbon fiber is immersed in the cement solution.

The carbon fiber means a fiber containing carbon as a main component.

A form of the carbon fiber is not particularly limited.

A length of the carbon fiber is preferably 30 mm or more, more preferably 50 mm or more, still more preferably 70 mm or more, and yet still more preferably 100 mm or more. In addition, a long-fiber carbon fiber may also be used, and for example, a long fiber of from about 10 cm to several ten meters may be used, and even a long fiber having a length more than the foregoing range may also be used. The length of the carbon fiber is not particularly limited, and for example, a long fiber having a length of about 8 km may be evenly arranged (laid) in the concrete formed body. This is because the flexural strength of the concrete formed body obtained by the first production method of the present invention tends to become higher.

A diameter of a cross section of the carbon fiber is preferably from 3 to 15 μm, more preferably from 5 to 11 μm, still more preferably from 6 to 8 μm, and yet still more preferably 7 μm. This is because the flexural strength of the concrete formed body obtained by the first production method of the present invention tends to become higher.

It is to be noted that in the case where the cross section of the carbon fiber is not circular, the diameter of the cross section means an equivalent projected-area circle diameter.

It is preferable that the carbon fiber is in a form of sheet-like woven fabric. Examples thereof include a sheet-like woven fabric having a thickness of from about 0.01 to 0.1 mm, in which the carbon fibers are woven in the machine direction and the transverse direction. In addition, a sheet-like woven fabric having a mass of from 50 to 200 g/m$^2$ is exemplified.

Such a carbon fiber is immersed in the cement solution. For example, the cement solution is put in a container, and the carbon fiber is immersed therein. Then, the carbon fiber is put in a closed vessel together with the container in a state where the carbon fiber is immersed in the cement solution in the container, and the inside of the closed vessel is subjected to pressure reduction by using a pressure reducer (e.g., a pressure reducing pump, etc.), thereby making it possible to hold the carbon fiber in a reduced pressure atmosphere. In addition, it is preferable that after a reduced pressure atmosphere is obtained by means of pressure reduction, the carbon fiber previously charged in a closed vessel is immersed in the cement solution in the same closed vessel.

Although the carbon fiber may be a carbon fiber in which a water-repellent organic material such as an epoxy resin, etc. is coated on a surface thereof, it is preferably a carbon fiber not coated with a water-repellent organic material. That is, the carbon fiber is preferably a carbon fiber not having a water-repellent organic material on a surface thereof. This is because the flexural strength of the concrete formed body obtained by the first production method of the present invention tends to become higher.

The water-repellent organic material means a hydrophobic organic material.

Although a time for holding the carbon fiber in the reduced pressure atmosphere is not particularly limited, it is preferably from 1 to 30 minutes, more preferably from 10 to 20 minutes, and still more preferably about 15 minutes. When the performance of the pressure reducer is high, the holding time can be shortened. It is to be noted that in the case of using a general rotary pump capable of performing pressure reduction from atmospheric pressure or the like, the holding time can be made to be from about 10 to 20 minutes.

Although a degree of pressure reduction of the reduced pressure atmosphere is not particularly limited, it is preferably from 5 to 60 Torr, more preferably from 5 to 40 Torr, and still more preferably from 5 to 30 Torr.

It may be presumed that by holding the carbon fiber in a reduced pressure atmosphere, when air bubbles of the carbon fiber are released and opened to atmospheric pressure, the cement solution invades into the inside of the carbon fiber. Then, it may be presumed that the affinity or adhesiveness between the carbon fiber and the cement or the like in the concrete composition in the inside of the concrete formed body is enhanced, whereby the flexural strength of the concrete formed body becomes higher.

FIG. 1 shows an enlarged photograph of a cross section of the concrete formed body obtained by the first production method of the present invention. This is a photograph in which the cross section of the concrete formed body is enlarged 1,000 times by using an optical microscope (a digital microscope VHX-1000, manufactured by Keyence Corporation). It can be confirmed that the carbon fiber adheres closely to the cement or the like existing on the surroundings thereof leaving no space.

According to such a defoaming step [2], a defoamed fiber can be obtained.

[Forming Step]

In the first production method of the present invention, the forming step is a step of placing the defoamed concrete and the defoamed fiber within a shuttering, followed by curing to obtain a high-strength concrete formed body.

In the forming step, first of all, the defoamed concrete and the defoamed fiber are placed within a shuttering.

The shuttering is not particularly limited, and shutterings of a conventionally known mode composed of a conventionally known material (for example, stainless steel, glass, or timber used for concrete shuttering), which are generally used on the occasion of placing a concrete, can be used.

In the case of using a sheet-like woven fabric as the carbon fiber in the defoaming step [2], in the forming step, it is preferable that the sheet-like woven fabric (carbon fiber) is deformed in an appropriate shape and charged in the shuttering, and the defoamed concrete is then placed so as to fill a gap of the sheet-like woven fabric.

In the defoaming step [2], in the case of using a string-like carbon fiber as the carbon fiber, in the forming step, for example, a square timber equipped with a metal hanger is installed in a shuttering made of a timber used for concrete shuttering, the defoamed fiber immersed in the cement solution is laid on the metal hanger, and the defoamed concrete is then placed. It is to be noted that it is preferable that the string-like carbon fiber is put in a netlike container (e.g., a perforated basket, etc.) and immersed in a separate container having the cement solution charged therein together with the netlike container, followed by submitting for the defoaming step [2].

After placing the defoamed concrete and the defoamed fiber within the shuttering, the resultant is cured by a conventionally known method. For example, standard curing or water curing is performed. It is preferable that standard curing is performed without taking off the shuttering, and the shuttering is then taken off, followed by performing water curing.

A curing time is not particularly limited, too, and it can be made to be conventionally known time. For example, standard curing of about 48 hours can be performed. In addition, for example, water curing of about 21 days can be performed.

According to such a forming step, a concrete formed body can be obtained.

The concrete formed body obtained by such a first production method of the present invention has higher flexural strength than that in the conventional techniques.

The first production method of the present invention can be carried out by a production apparatus of a concrete formed body, which is equipped with a closed vessel A capable of including in the inside thereof the container having the concrete composition charged therein; a pressure reducer A for rendering the inside of the closed vessel A in a reduced pressure state; a closed vessel B capable of including in the inside thereof a container charged with the cement solution having the carbon fiber immersed therein; and a pressure reducer B for rendering the inside of the closed vessel B in a reduced pressure state.

The closed vessel A and the closed vessel B may be the same as or different from each other.

The pressure reducer A and the pressure reducer B may be the same as or different from each other.

Figure 2:
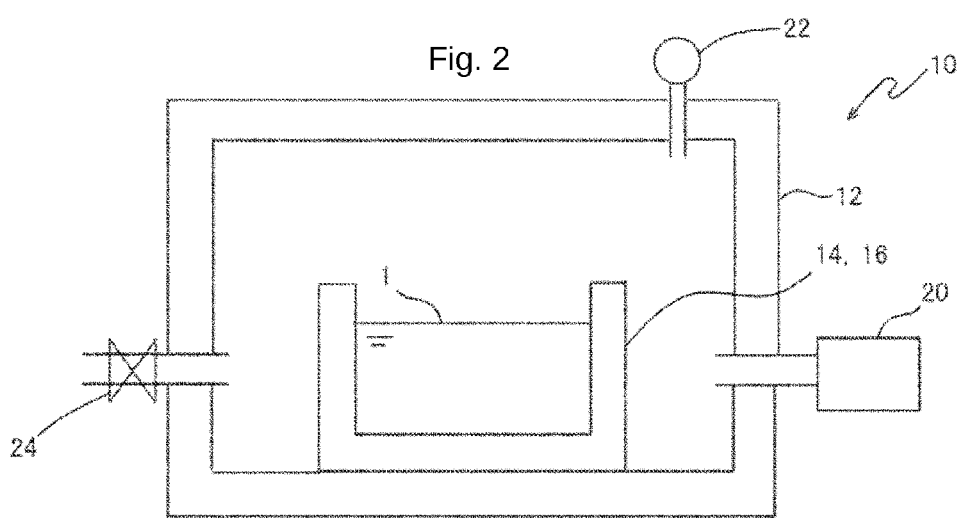
FIG. 2 is a diagrammatic view of an apparatus which can be used in the first production method of the present invention.

As such a production apparatus, an apparatus of a mode shown in FIG. 2 can be exemplified.

An apparatus 10 shown in FIG. 2 is equipped with a closed vessel 12 and a pressure reducing pump 20. In addition, the closed vessel 12 is provided with a vacuum gauge 22 and an air valve 24. Here, it is possible to install in the closed vessel 12 a container 14 having a concrete composition 1 charged therein and a container 16 having charged therein a carbon fiber immersed in a cement solution.

The closed vessel 12 has only to be able to hold a reduced pressure state of from about 5 to 15 Torr (in other words, it is also possible to hold a reduced pressure state having a degree of vacuum lower than 30 Torr, 40 Torr, and 60 Torr (namely, a reduced pressure state close to atmospheric pressure)), and a closed vessel made of a metal such as stainless steel, etc., glass, or the like can be used. In addition, it is possible to install in the inside of the closed vessel 12 the container 14 having the concrete composition 1 cast therein and the container 16 having charged therein a carbon fiber immersed in a cement solution. The closed vessel 12 is provided with an opening capable of holding the state of airtightness after installing the container 14. Furthermore, the closed vessel 12 is connected with the pressure reducing pump 20, the vacuum gauge 22, and the air valve 24 and is constructed such that each of them is able to keep the state of airtightness. It is to be noted that in the case of using a container made of a metal such as stainless steel, etc. for the closed vessel 12, it is desirable to provide an observation window such that the state of the concrete composition 1 in the inside thereof can be observed.

The container 14 has only to be a container capable of charging the concrete composition 1 in the inside thereof, and a steel-made shuttering, a wood-made shuttering, and the like can be used. In the case of fabricating a precast product in the factory, a steel-made shuttering is desirable from the standpoint of costs.

The same is also applicable to the container 16, and it has only to be a container which after charging the cement solution, is able to immerse the carbon fiber in the cement solution.

The pressure reducing pump 20 is a pressure reducer and reduces the pressure within the closed vessel 12. As the pressure reducing pump 20, those of a type capable of being actuated from atmospheric pressure, such as a diaphragm pump, a rotary pump, etc., can be used. In addition, the pressure reducing pump 20 is not limited to the above-described pumps so long as it is a pressure reducer capable of performing the pressure reduction to a prescribed value, and a variety of pressure reducers may be used.

The vacuum gauge 22 measures the pressure within the closed vessel 12. A mechanical pressure gauge such a Bourdon tube gauge, a diaphragm gauge, etc. can be used for the vacuum gauge 22. Other pressure gauges may also be used for the vacuum gauge 22 so long as they are able to measure a pressure of from atmospheric pressure to about 5 to 15 Torr.

The air valve 24 is a valve that is the so-called vacuum valve. The air valve 24 is closed when the inside of the closed vessel 12 is rendered in a reduced pressure and opened when the pressure within the pressure-reduced closed vessel 12 is returned to atmospheric pressure.

Figure 3:
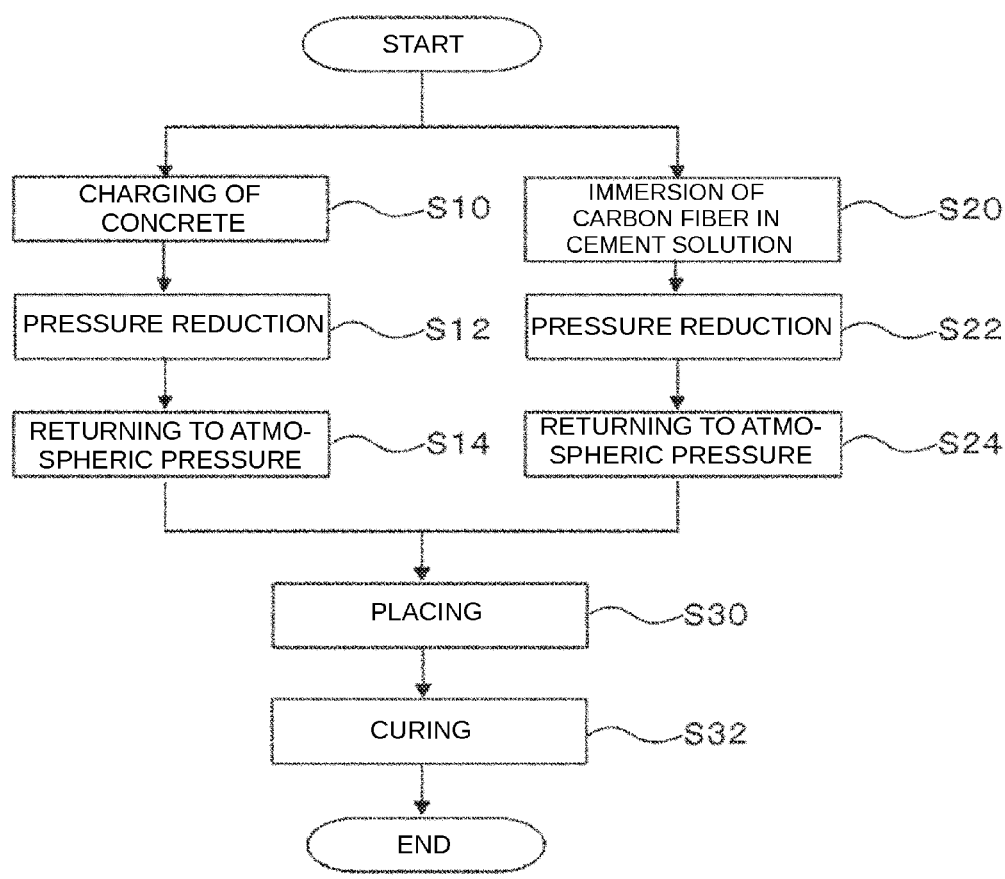
FIG. 3 is a flow chart showing an example of operation procedures in the first production method of the present invention.

A concrete formed body can be produced by using the apparatus 10 according to procedures shown in FIG. 3.

First of all, the concrete composition 1 is charged, in other words, cast in the inside of the container 14, and the container 14 having the concrete composition 1 cast therein is installed on the bottom surface within the closed vessel 12 (Step S10).

Subsequently, after closing the air valve 24, the pressure reduction of the inside of the closed vessel 12 is started by the pressure reducing pump 20, and the inside of the closed vessel 12 is subjected to pressure reduction to about 20 Torr while confirming the pressure by the vacuum gauge 22 (Step S12).

According to such an operation, the air which has been entrained at the time of fabricating a concrete composition is aerated, whereby a generated steam can be discharged from the concrete composition 1. Thereafter, the air valve 24 is opened, thereby returning the inside of the closed vessel 12 to atmospheric pressure (Step S14).

Subsequently, the cement solution is charged in the container 16, and the carbon fiber is immersed in this cement solution. Then, the container 16 charged with the cement solution having the carbon fiber immersed therein is installed on the bottom surface within the closed vessel 12 (Step S20).

Subsequently, after closing the air valve 24, the pressure reduction of the inside of the closed vessel 12 is started by the pressure reducing pump 20, and the inside of the closed vessel 12 is subjected to pressure reduction to about 20 Torr while confirming the pressure by the vacuum gauge 22 (Step S22).

According to such an operation, the air contained in the carbon fiber can be discharged. Thereafter, the air valve 24 is opened, thereby returning the inside of the closed vessel 12 to atmospheric pressure (Step S24).

Subsequently, the defoamed concrete and the defoamed fiber are placed within the shuttering (Step S30).

Then, the resultant is cured (Step S32), whereby a concrete formed body can be obtained.

<Second Production Method of the Present Invention>

The second production method of the present invention is described.

According to the second production method of the present invention, after fabricating the concrete composition, an irradiation time of a microwave is determined on the basis of a water-cement ratio at the time of fabricating the concrete composition.

An irradiation time t (s) of the microwave can be determined from a mass Wam (g) of water Wa (also including the moisture of a water reducing agent or the like) used for fabricating the concrete composition, a mass Wbm (g) of water Wb determined from the targeted water-cement ratio, an evaporation heat (40.8 kJ/mole) of water, 18 g as a mass of one mole of water, an output P (W) of a microwave generator, and an efficiency η of the microwave (it can be made to be from 0.6 to 0.7, and preferably 0.65 (in the case of a concrete)) according to the following equation (II).

$$t=((Wam-Wbm) \times 40800/18)/(P \times \eta) \qquad \text{Equation (II)}$$

[Pressure Reduction and Microwave Irradiation]

The concrete composition is placed within a shuttering of a desired mode, and an atmosphere where the concrete composition exists is then rendered in a reduced pressure state. For example, the concrete composition is put in a closed vessel together with the concrete composition-placed shuttering, and the inside of the closed vessel is subjected to pressure reduction by using a pressure reducer (e.g., a pressure reducing pump, etc.), thereby making it possible to render the inside of the closed vessel in a reduced pressure atmosphere. Here, the reduced pressure state may be held for a first prescribed time (for example, from about 3 minutes to 20 minutes, preferably from 3 minutes to 10 minutes, and more preferably from 3 minutes to 5 minutes).

Although a degree of pressure reduction is not particularly limited, the pressure of the atmosphere where the concrete composition exists is preferably from 5 to 60 Torr, more preferably from 5 to 40 Torr, and still more preferably from 5 to 30 Torr.

In this way, the atmosphere where the concrete composition exists is rendered in a reduced pressure state, and preferably, after holding the reduced pressure state for a first prescribed time as described above, the concrete composition is irradiated with a microwave for the irradiation time t determined according to the foregoing equation (II). Here, a frequency of the microwave is not particularly limited, and for example, a microwave having a frequency of from 900 to 2,500 MHz and an output of from 100 W to 30 kW can be used.

When the concrete composition is irradiated with a microwave in the reduced pressure atmosphere, the moisture is released from the surface of the concrete composition. In addition, air bubbles containing the moisture are released from the inside to the outside of the concrete composition. As a result, the moisture in the concrete composition is decreased.

In addition, in a process in which the concrete composition hardens little by little, hardening uniformly starts, and a channel of moisture movement is clogged, and therefore, in the case of irradiating the concrete with a microwave, there is a possibility of disturbing the moisture or air bubbles in the inside from coming out to the outside with a lapse of time.

In addition, it is preferable to give vibrations to the concrete composition in the reduced pressure atmosphere. For example, by installing a vibrator in a closed vessel, installing thereon a container having the concrete composition charged therein, and actuating the vibrator, it is possible to apply vibrations. When vibrations are applied to the concrete composition, the release of air bubbles from the inside of the concrete composition is promoted.

Here, as the vibrator, a vibration generator or an ultrasonic vibrator can be used.

In addition, by rendering the atmosphere in a reduced pressure state while controlling such that the moisture of a surface portion of the concrete composition in the reduced pressure atmosphere is a fixed value or more, it is possible to efficiently remove the moisture in the inside of the concrete composition so as not to disturb the release of air bubbles from the inside of the concrete composition.

By controlling the moisture concentration of the surface portion of the concrete composition, the moisture concentration is made to be preferably 15% by mass or more, more preferably 14% by mass or more, still more preferably 13% by mass or more, and yet still more preferably 12% by mass or more. This is because the moisture in the inside of the concrete composition can be efficiently removed.

For example, by measuring a surface resistivity value of the concrete composition, it is possible to control the moisture concentration on the surface of the concrete composition such that it is a fixed value or more. Specifically, by controlling the surface resistivity value of the concrete composition such that it is not more than 40 k$\Omega$/sq, it is possible to control the moisture concentration on the surface of the concrete composition to a fixed value or more. This surface resistivity value is preferably not more than 35 k$\Omega$/sq, more preferably not more than 30 k$\Omega$/sq, still more preferably not more than 25 k$\Omega$/sq, and yet still more preferably not more than 20 k$\Omega$/sq.

As described previously, in the case where the moisture concentration of the subject portion is controlled by measuring the resistivity value on the surface of the concrete composition in the reduced pressure atmosphere, or other means, whereby the moisture concentration becomes smaller than the prescribed value, the surface portion of the concrete composition, or the like may be stirred.

In the case where the moisture concentration becomes smaller than the prescribed value, moisture may be applied to the surface portion of the concrete composition by using an atomizer or the like.

After the irradiation time t has elapsed, the irradiation with a microwave may be stopped, and at the same time, the vibration and the pressure reduction may be stopped. Here, after stopping the irradiation with a microwave, the reduced pressure state may be held for a second prescribed time (for example, from about 2 minutes to 5 minutes, and preferably from 3 minutes to 5 minutes) preferably while continuing the vibration and the pressure reduction.

After returning from the reduced pressure state to atmospheric pressure, a concrete formed body can be obtained by performing curing in the same manner as that in a general concrete fabrication step. It is to be noted that the vibration may be performed always when the atmosphere is in the reduced pressure state, or it may be performed only at the time of irradiation with a microwave. In addition, the vibration may also be performed intermittently at fixed time intervals without being always performed.

Such a method for producing a concrete formed body of the present invention can be carried out by a production apparatus of a concrete formed body, which is equipped with a shuttering within which a concrete composition is placed; a closed vessel capable of including the shuttering in the inside thereof; a pressure reducer for rendering the inside of the closed vessel in a reduced pressure state; and a microwave generator for irradiating the concrete placed within the shuttering with a microwave. Such a production apparatus of a concrete formed body may also be an apparatus of a mode shown in FIG. 4, which is used in the Example as described later. A concrete formed body can be produced by such an apparatus.

<Third Production Method of the Present Invention>

The third production method of the present invention is described.

According to the third production method of the present invention, the concrete composition is fabricated and then placed within a shuttering, and an atmosphere where the concrete exists is rendered in a reduced pressure state for a prescribed time.

[Pressure Reduction]

The concrete composition is placed within a shuttering of a desired mode, and an atmosphere where the concrete composition exists is then rendered in a reduced pressure state. For example, the concrete composition is put in a closed vessel together with the concrete composition-placed shuttering, and the inside of the closed vessel is subjected to pressure reduction by using a pressure reducer (e.g., a pressure reducing pump, etc.), thereby making it possible to render the inside of the closed vessel in a reduced pressure atmosphere. The reduced pressure state is held for a prescribed time. The prescribed time can be, for example, made to be from 3 minutes to 20 minutes, and it is preferably from 5 minutes to 10 minutes. By rendering the atmosphere in a reduced pressure state, the boiling point of water is lowered, and the moisture in the concrete composition is easy to become a steam. As a result, it is possible to lower the water-cement ratio of the concrete composition after placing. In other words, it is possible to increase the strength of the placed concrete composition.

Although a degree of pressure reduction is not particularly limited, the pressure of the atmosphere where the concrete composition-placed shuttering exists is preferably from 5 to 60 Torr, more preferably from 5 to 40 Torr, and still more preferably from 5 to 30 Torr.

When the concrete composition is held in the reduced pressure atmosphere, the boiling point of water is lowered, and the moisture in the concrete composition becomes a steam, whereby the moisture is released from the concrete composition. In addition, air bubbles containing the moisture are released from the inside to the outside of the concrete. As a result, the moisture in the concrete is decreased.

In addition, it is preferable to give vibrations to the concrete composition in the reduced pressure atmosphere. For example, by installing a vibrator in a closed vessel, installing thereon a container having the concrete composition charged therein, and actuating the vibrator, it is possible to apply vibrations. When vibrations are applied to the concrete composition, the release of air bubbles from the inside of the concrete composition is promoted.

Here, as the vibrator, a vibration generator or an ultrasonic vibrator can be used.

Here, by irradiating the concrete composition with a microwave while more minutely controlling the amount of moisture of the concrete composition, specifically controlling such that the moisture of the surface portion of the concrete composition is a fixed value or more, the moisture in the inside of the concrete composition can be efficiently removed so as not to disturb the release of air bubbles from the inside of the concrete composition.

In addition, by controlling the moisture concentration of the surface portion of the concrete composition, the moisture concentration is made to be preferably 15% by mass or more, more preferably 14% by mass or more, still more preferably 13% by mass or more, and yet still more preferably 12% by mass or more. This is because the moisture in the inside of the concrete composition can be efficiently removed.

For example, by measuring a surface resistivity value of the concrete composition, it is possible to control the moisture concentration on the surface of the concrete composition such that it is a fixed value or more. Specifically, by controlling the surface resistivity value of the concrete composition such that it is not more than 40 k$\Omega$/sq, it is possible to control the moisture concentration on the surface of the concrete composition to a fixed value or more. This surface resistivity value is preferably not more than 35 k$\Omega$/sq, more preferably not more than 30 k$\Omega$/sq, still more preferably not more than 25 k$\Omega$/sq, and yet still more preferably not more than 20 k$\Omega$/sq.

As described previously, in the case where the moisture concentration of the subject portion is controlled by measuring the resistivity value on the surface of the concrete composition in the reduced pressure atmosphere, or other means, whereby the moisture concentration becomes smaller than the prescribed value, the surface portion of the concrete composition, or the like may be stirred.

In the case where the moisture concentration becomes smaller than the prescribed value, moisture may be applied to the surface portion of the concrete composition by using an atomizer or the like.

Such a third production method of the present invention can be carried out by a production apparatus of a concrete formed body, which is equipped with a shuttering within which a concrete composition is placed; a closed vessel capable of including the shuttering in the inside thereof; and a pressure reducer for rendering the inside of the closed vessel in a reduced pressure state. Such a production apparatus of a concrete formed body may also be an apparatus of a mode shown in FIG. 6, which is used in the Example as described later. A concrete formed body can be produced by such an apparatus.

EXAMPLES

Embodiment 1

Experimental examples corresponding to the first production method of the present invention are described.

First of all, the following raw materials were prepared.

Portland cement (model No.: ordinary Portland cement, manufactured by Taiheiyo Cement Corporation)

Silica fume (model No.: MEYCO MS610, manufactured by BASF Pozzolith Ltd.)

Silica sand (fine aggregate): silica sand No. 3 and silica sand No. 5

Water reducing agent (model No.: RHEOBUILT SP-8HU, manufactured by BASF Pozzolith Ltd.)

PVA fiber (a trade name: RECS 100L×12 mm, manufactured by Kuraray Co., Ltd.)

Water (purified water)

In the following, a basic formulation is a formulation in which the following components are added to 1000 g of the cement.

Silica fume: 100 g (ratio to cement: 10%)

Silica sand No. 3: 275 g (weight ratio to (cement+silica fume): 25%)

Silica sand No. 5: 275 g (weight ratio to (cement+silica fume): 25%)

Water reducing agent: 22 g (weight ratio to (cement+silica fume): 2%)

PVA fiber: 11 g (weight ratio to (cement+silica fume): 1%)

Water: 174.9 g ((weight of cement)+(weight of silica fume)−(weight of water reducing agent))

Subsequently, the above-described raw materials were mixed by using a mortar mixer. Specifically, the following operation was performed.

First of all, the mortar mixer was charged with the cement (2,000 g), the silica fume (200 g), the silica sand No. 3 (550 g), and the silica sand No. 5 (550 g) on the basis of the above-described basic formulation. Then, the contents were stirred at a low speed (62 rpm) for one minute.

Subsequently, water (349.8 g) and the water reducing agent (44 g) were mixed to obtain water for kneading. Then, the obtained water for kneading was charged in the mortar mixer, and the contents were stirred at a low speed (62 rpm) for one minute and then stirred at a high speed (125 ppm) for two minutes.

Subsequently, the PVA fiber (22 g) was charged, followed by stirring at a low speed (62 rpm) for two minutes.

It is to be noted that the specification of the mortar mixer (a Hobart-type mixer KC-8, manufactured by Kansai Kiki Seisakusho, K.K.) as used herein is as follows.

Capacity: about 5 L

Rotation speed:

Low speed: revolution, 62 rpm; rotation, 141 rpm

High speed: intersection, 125 rpm; rotation, 284 rpm

Adjustable: revolution, 12 to 180 rpm; rotation, 27 to 410 rpm

Power source: AC100/110 V, power equipment capacity, 2 kVA

Weight: about 70 kg

Such an operation was performed to obtain a concrete composition [1].

Subsequently, the obtained concrete composition [1] was put in a plastic container, which was then put in a polycarbonate desiccator. Then, after making the desiccator airtight, a vacuum pump was actuated to perform evacuation for 15 minutes. Here, a pressure within the polycarbonate desiccator was adjusted to 30 Torr.

A material obtained by subjecting the concrete composition [1] to such a pressure reduction treatment is hereinafter referred to as "defoamed concrete [1]".

It is to be noted that the specification of the vacuum pump (model No.: GLD-051, manufactured by ULVAC, Inc.) is as follows.

Pumping speed: 50 L/min (at 50 Hz), 60 L/min (at 60 Hz)
Ultimate pressure: $6.7 \times 10^{-2}$ (Pa)
Oil capacity: 500 to 800 mL The above-described operation of mixing the raw materials and furthermore, obtaining the defoamed concrete [1] from the obtained concrete composition [1] was repeated three times, thereby obtaining a sufficient amount of the defoamed concrete [1].

Subsequently, a sheet-like carbon fiber (BT70-20 100C 50, manufactured by Toray Industries, Inc.) was prepared. Then, this was cut into a size of 380 mm×500 mm.

Subsequently, the above-described Portland cement (ordinary Portland cement, manufactured by Taiheiyo Cement Corporation) and water (purified water) were mixed such that a water-cement ratio was from 25% to 50%, thereby obtaining 5 kg of a cement solution.

Then, this cement solution was put in a container, and the cut carbon fiber was further put in the container, thereby immersing the carbon fiber in the cement solution.

Subsequently, the container in which the carbon fiber was immersed in the cement solution was put in a polycarbonate desiccator. Then, after making the desiccator airtight, a vacuum pump was actuated to perform evacuation for 15 minutes. Here, a pressure within the polycarbonate desiccator was adjusted to 30 Torr.

It is to be noted that the same polycarbonate desiccator and vacuum pump used on the occasion of preparing the concrete composition [1] as described above were used as the polycarbonate desiccator and vacuum pump.

A material obtained after subjecting the carbon fiber to such a defoaming treatment is hereinafter also referred to as "defoamed fiber [1]".

Subsequently, a shuttering for flexural test (KC-183A, 100 mm (W)×100 mm (H)×400 mm (L), manufactured by Kansai Kiki Seisakusho, K.K.) was charged with the defoamed concrete [1] and the defoamed fiber [1].

Specifically, the following operation was performed.

First of all, the defoamed concrete [1] was placed in the shuttering for flexural test in a height of 5 mm from the bottom.

Subsequently, after charging the defoamed fiber [1] having been deformed in an appropriate shape, the defoamed concrete [1] was further placed. Here, the defoamed concrete [1] was charged in a space in the defoamed fiber [1] such that the space was not opened. Then, the defoamed fiber was completely immersed in the defoamed concrete [1].

Then, the outer surface of the shuttering for flexural test was covered by a plastic wrap; standard curing was performed for 48 hours; shuttering removal was then performed; and the obtained specimen for test was put in a curing water bath (water temperature: 20° C.±2° C.) and subjected to water curing until a material age of 21 days.

There was thus obtained a concrete formed body [1].

Subsequently, the obtained concrete formed body [1] was measured for flexural strength by the method of test for flexural strength of concrete in conformity with JIS A1106. As a result, the flexural strength was found to be 38.3 MPa.

Subsequently, the concrete composition [1] before being subjected to the above-described pressure reduction treatment was charged in the above-described shuttering for flexural test. The carbon fiber was not charged. Then, similar to the case of obtaining the concrete formed body [1], the outer surface of the shuttering for flexural test was covered by a plastic wrap; standard curing was performed for 48 hours; shuttering removal was then performed; and the obtained specimen for test was put in a curing water bath (water temperature: 20° C.±2° C.) and subjected to water curing until a material age of 21 days, thereby obtaining a concrete formed body [2].

Then, similar to the case of obtaining the concrete formed body [1], the obtained concrete formed body [2] was measured for flexural strength. As a result, the flexural strength was found to be 14.5 MPa.

Subsequently, the defoamed concrete [1] and the carbon fiber before being subjected to the above-described pressure reduction treatment were charged in the above-described shuttering for flexural test. A charging method was the same as that in the case of obtaining the concrete formed body [1].

Then, similar to the case of obtaining the concrete formed body [1], the outer surface of the shuttering for flexural test was covered by a plastic wrap; standard curing was performed for 48 hours; shuttering removal was then performed; and the obtained specimen for test was put in a curing water bath (water temperature: 20° C.±2° C.) and subjected to water curing until a material age of 21 days, thereby obtaining a concrete formed body [3].

Then, similar to the case of obtaining the concrete formed body [1], the obtained concrete formed body [3] was measured for flexural strength. As a result, the flexural strength was found to be 19.0 MPa.

Subsequently, the defoamed concrete [1] was charged in the above-described shuttering for flexural test. The carbon fiber was not charged. Then, similar to the case of obtaining the concrete formed body [1], the outer surface of the shuttering for flexural test was covered by a plastic wrap; standard curing was performed for 48 hours; shuttering removal was then performed; and the obtained specimen for test was put in a curing water bath (water temperature: 20° C.±2° C.) and subjected to water curing until a material age of 21 days, thereby obtaining a concrete formed body [4].

Then, similar to the case of obtaining the concrete formed body [1], the obtained concrete formed body [4] was measured for flexural strength. As a result, the flexural strength was found to be 16.6 MPa.

Embodiment 2

Experimental examples corresponding to the second production method of the present invention are described.

Example 2-1

Figure 4:
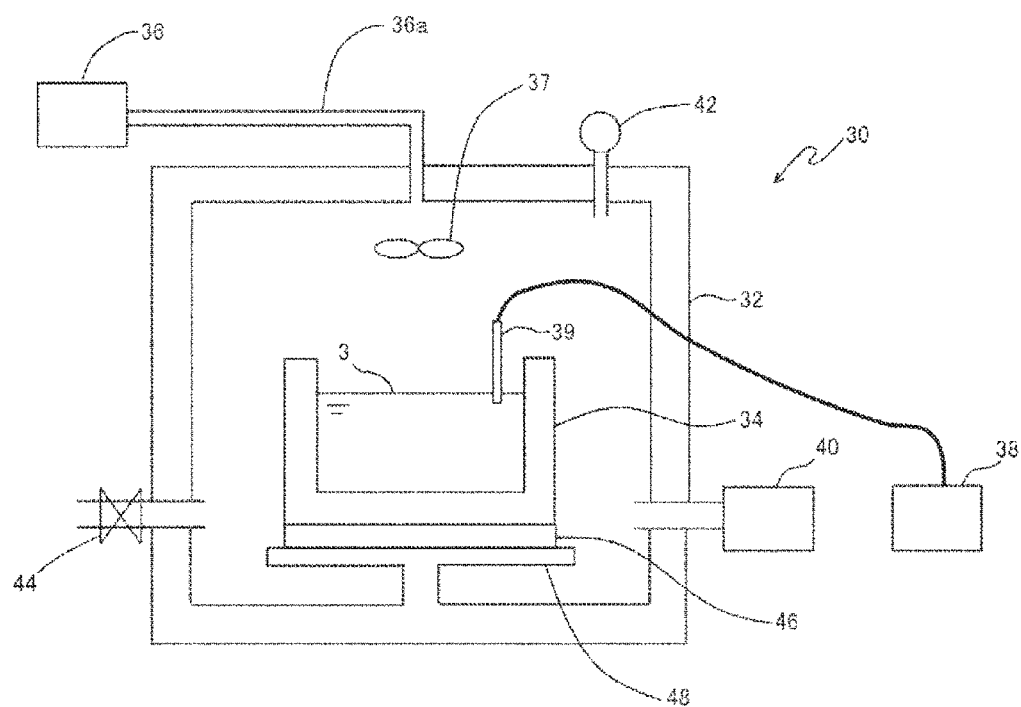
FIG. 4 is a diagrammatic view of an apparatus used in the Examples of a second production method of the present invention.

An apparatus shown in FIG. 4 was prepared. An apparatus 30 shown in FIG. 4 is constructed of a closed vessel 32, a microwave generator 36, a waveguide 36a, a pressure reducing pump 40, a vibrator 46, and a turntable 48. In addition, the closed vessel 32 is provided with a stirrer fan 37, a vacuum gauge 42, and an air valve 44. Here, a shuttering 34 having a concrete composition 3 placed therein can be installed in the closed vessel 32.

The apparatus 30 further has a surface resistivity meter 38 and an electrode 39 for measuring the amount of moisture on the surface of the concrete composition 3 within the shuttering 34.

The closed vessel 32 has only to be able to hold a reduced pressure state of from about 5 to 15 Torr (in other words, it is also possible to hold a reduced pressure state having a degree of vacuum lower than 30 Torr, 40 Torr, and 60 Torr (namely, a reduced pressure state close to atmospheric pressure)), and a vessel made of a metal such as stainless steel, etc., glass, or the like can be used. In addition, it is possible to install in the inside of the closed vessel 32 the shuttering 34 having the concrete composition 3 cast thereinto. The closed vessel 32 is provided with an opening capable of holding the state of airtightness after installing the shuttering 34. Furthermore, the closed vessel 32 is connected with the waveguide 36a to be connected with the microwave generator 36, the electrode 39, the pressure reducing pump 40, the vacuum gauge 42, and the air valve 44 and is constructed such that each of them is able to keep the state of airtightness. It is to be noted that in the case of using a container made of a metal such as stainless steel, etc. for the closed vessel 32, it is desirable to provide an observation window such that the state of the concrete composition 3 in the inside thereof can be observed.

The shuttering 34 has only to be a shuttering capable of placing the concrete composition 3 in the inside thereof, and a steel-made shuttering, a wood-made shuttering, and the like can be used. In the case of fabricating a precast product in the factory, a steel-made shuttering is desirable from the standpoint of costs.

As the microwave generator 36, a microwave generator having a frequency of from 900 to 2,500 MHz and an output of from 100 W to 30 kW can be used, and the frequency and the output are properly chosen according to a size of the concrete formed body to be fabricated, or the like. A microwave generated from the microwave generator 36 goes through the waveguide 36a and is radiated toward the inside of the closed vessel 32.

The stirrer fan 37 diffuses the microwave radiated from the waveguide 36a efficiently into the inside of the closed vessel 32. According to this, the microwave is approximately uniformly radiated from each direction of the shuttering 34.

The surface resistivity meter 38 measures the resistivity on the surface of the concrete composition 3 placed within the shuttering 34 by using the electrode 39, thereby measuring the amount of moisture on the surface of the concrete composition 3. The electrode 39 is connected with the surface resistivity meter 38 and brought into contact with the surface of the concrete composition 3. As the surface resistivity meter 38, for example, Loresta MCP-T610 (manufactured by Mitsubishi Chemical Corporation) can be used.

The pressure reducing pump 40 is a pressure reducer and reduces the pressure within the closed vessel 32. As the pressure reducing pump 40, those of a type capable of being actuated from atmospheric pressure, such as a diaphragm pump, a rotary pump, etc., can be used. In addition, the pressure reducing pump 40 is not limited to the above-described pumps so long as it is a pressure reducer capable of performing the pressure reduction to an extent of from 5 to 15 Torr, and a variety of pressure reducers may be used.

The vacuum gauge 42 measures the pressure within the closed vessel 32. A mechanical pressure gauge such a Bourdon tube gauge, a diaphragm gauge, etc. can be used for the vacuum gauge 42. Other pressure gauges may also be used for the vacuum gauge 42 so long as they are able to measure a pressure of from atmospheric pressure to about 5 to 15 Torr.

The air valve 44 is a valve that is the so-called vacuum valve. The air valve 44 is closed when the inside of the closed vessel 32 is rendered in a reduced pressure state and opened when the pressure within the pressure-reduced closed vessel 32 is returned to atmospheric pressure.

The vibrator 46 is installed on the turntable 48 as described later within the closed vessel 32 and gives vibrations to the shuttering 34 installed on the vibrator 46. As the vibrator 46, a variety of vibration generators can be used, and for example, an electro-dynamic vibrator, a piezoelectric vibrator, a hydraulic vibrator, and the like can be used. In addition, an ultrasonic vibrator may also be used. It is to be noted that the vibrator 46 is shielded against the microwave.

The turntable 48 is installed within the closed vessel 32 and rotates such that the microwave to be radiated in the inside of the closed vessel 32 is evenly radiated on the concrete composition 3 placed within the shuttering 34. The vibrator 46 and the shuttering 34 are put on the top of the turntable 48. In addition, in the case where a large-sized concrete formed body which is hardly rotated is fabricated, or in the case where a power source cable or the like of the vibrator 46 is not able to cope with the rotation, a movable table of performing a single-axis reciprocating motion (for example, a motion of reciprocating on the X-axis) may be used.

In addition, the apparatus 30 is provided with a stirring rod (not shown) capable of mixing by stirring a surface portion of the concrete composition 3 having been cast into the shuttering 34, and by operating this stirring rod from the outside of the closed vessel 32, it is possible to mix by stirring the surface portion of the concrete composition 3 having been cast into the shuttering 34. Furthermore, a sprayer for spraying water onto the surface of the concrete composition 3 may be provided.

Figure 5:
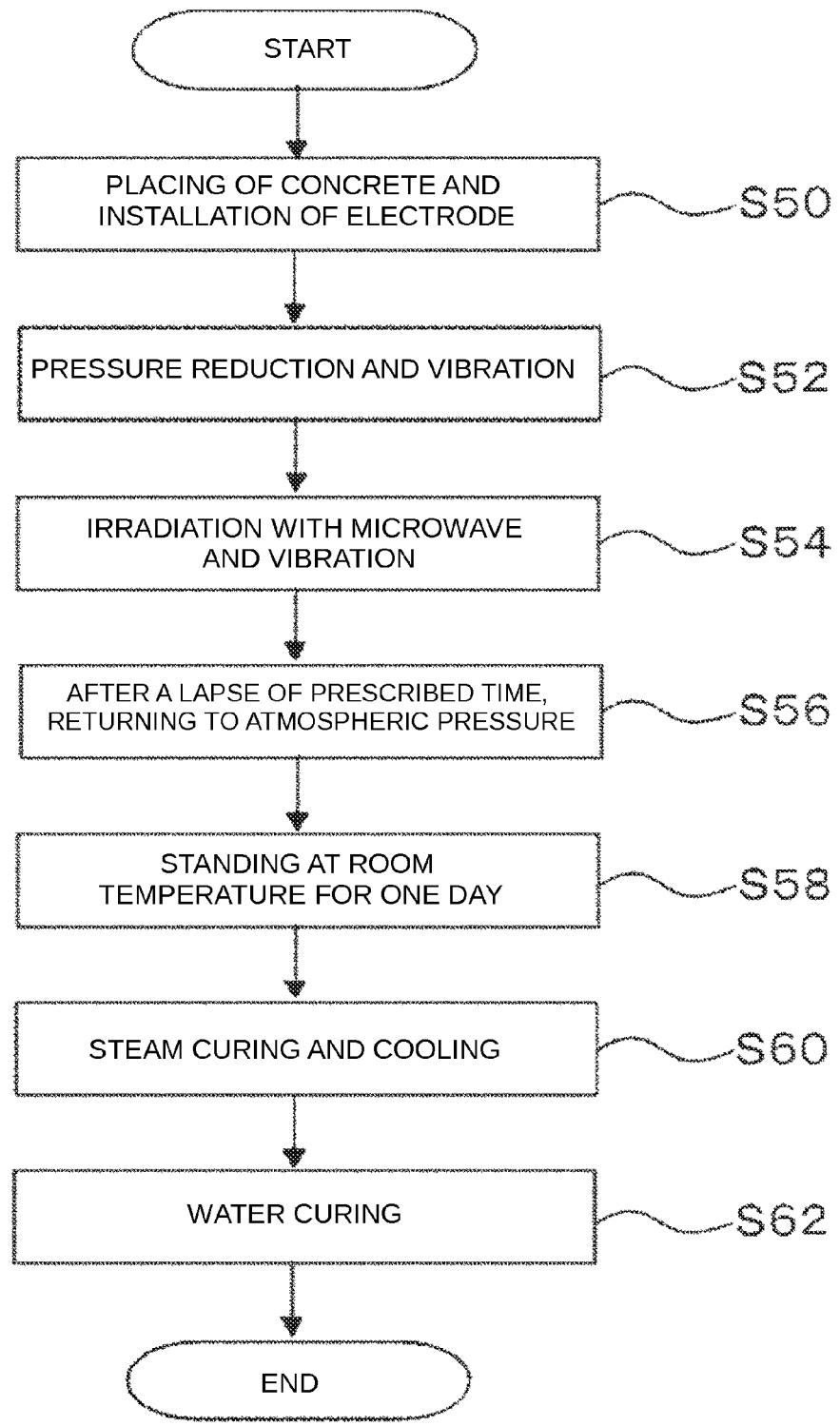
FIG. 5 is a flow chart showing operation procedures in the Examples of the second production method of the present invention.

A high-strength concrete was produced by using the apparatus 30. The production method is hereunder described according to a flow chart shown in FIG. 5.

First of all, the concrete composition 3 was placed, i.e., cast in the inside of the shuttering 34, and the shuttering 34 having the concrete composition 3 cast thereinto was installed on the vibrator 46 (turntable 48) within the closed vessel 32 (Step S50).

Here, the concrete composition 3 is a composition (so-called mortar) obtained by thoroughly mixing the following cement, silica fume, silica sand, water reducing agent, and water.

Portland cement (model No.: ordinary Portland cement, manufactured by Taiheiyo Cement Corporation): 1,200 g Silica fume (model No.: MEYCO MS610, manufactured by BASF Pozzolith Ltd.): 120 g Silica sand (fine aggregate): silica sand No. 3: 330 g and silica sand No. 5: 330 g Water reducing agent (model No.: RHEOBUILD SP-8HU, manufactured by BASF Pozzolith Ltd.): 26.4 g Water (purified water): 237.6 g Water-cement ratio: 20%

It is to be noted that the foregoing were mixed to fabricate three cylindrical specimens for test each having a weight of 450 g.

Furthermore, the electrode 39 was installed on the surface of the cast concrete composition 3, thereby enabling one to continuously measure the resistivity on the surface of the concrete composition 3 by the surface resistivity meter 38.

Subsequently, after closing the air valve 44, the pressure reduction in the inside of the closed vessel 32 was started by the pressure reducing pump 40, and the inside of the closed vessel 32 was subjected to pressure reduction to an extent of about 20 Torr while confirming the pressure by the vacuum gauge 42 (Step S52).

Here, after reducing the pressure to a prescribed pressure, the vibrator 46 was actuated for the purpose of vibrating for a first prescribed time (for example, from about 3 minutes to 10 minutes). According to this, it is possible to aerate the air entrained at the time of fabricating a concrete composition before irradiation with a microwave.

Subsequently, the microwave generator 36 was actuated at a frequency of 2,450 MHz and an output of 200 W for the irradiation time t determined according to the equation (II), and not only the concrete composition 3 placed in the shuttering 34 was irradiated with a microwave, but driving of the turntable 48 was started (Step S54). It is to be noted that the vibrator 46 was continuously rendered in an actuated state.

At that time, the concrete composition 3 (including the surface portion) was mixed by stirring by means of vibration by the vibrator 46, thereby preventing an excessive lowering of the amount of moisture on the surface. In the case where the amount of moisture in the surface portion of the concrete composition 3 is still lowered even by means of vibration, by mixing by stirring the surface portion of the concrete composition 3 by using a stirring rod, the lowering of the amount of moisture can be prevented.

It is to be noted that in order to more minutely control the amount of moisture of the concrete composition 3, the resistivity value on the surface of the concrete composition 3 was always measured by the surface resistivity meter 38 during a period of time of irradiation with a microwave. At that time, the control was made such that the surface resistivity value did not exceed 40 kΩ/sq. Specifically, in the case where the surface resistivity value was high, the surface portion of the concrete composition 3 was mixed by stirring with a stirring rod, thereby performing the adjustment such that the moisture of this portion was not lowered excessively, or vibration force was adjusted by adjusting the output of the vibrator 46. It is to be noted that in the case where it is not required to minutely control the amount of moisture of the concrete composition 3, the surface resistivity meter 38 and the electrode 39 may not be provided.

After a lapse of the first prescribed time, irradiation with a microwave was performed for the irradiation time t. When the irradiation with a microwave was finished, the microwave generator 36 and the turntable 48 were stopped. Thereafter, after a lapse of a second prescribed time (for example, from about 3 minutes to 5 minutes), the vibrator 46 was stopped, and the air valve 44 was opened, thereby returning the inside of the closed vessel 32 to atmospheric pressure (Step S56).

Subsequently, the concrete composition 3 and the shuttering 34 were taken out from the closed vessel 32 and allowed to stand at room temperature for one day (Step S58). Thereafter, steam curing (at 90° C. for 4 hours) and cooling (standing at room temperature for 14 hours) were performed (Step S60). Furthermore, water curing was performed for 19 days (Step S62), thereby obtaining a specimen for test at a material age of 21 days.

The irradiation time t of the microwave was adjusted in this way, thereby obtaining a concrete formed body (specimen for test) having a water-cement ratio of 19.6%.

Subsequently, the obtained specimen for test was measured for compression strength by using a fully automatic concrete compression testing machine, CONCRETO 2000 (manufactured by Shimadzu Corporation). As a result, the compression strength was found to be 172.2 MPa (an average value of the three specimens for test).

Comparative Example 2-1

Next, as Comparative Example 2-1, the same concrete composition as that used in the foregoing Example 2-1 was cast into the inside of the shuttering 34, and after allowing to stand at room temperature, water curing was performed to obtain a specimen for test at a material age of 21 days. Thereafter, the compression strength was measured in the same method as that in Example 2-1. As a result, the compression strength was found to be 114.6 MPa (an average value of the three specimens for test).

Comparative Example 2-2

As Comparative Example 2-2, the same concrete as that used in the foregoing Example 2-1 was cast into the inside of the shuttering 34 and installed in the inside of the closed vessel 32; thereafter, the air valve 44 was closed to make the closed vessel 32 airtightness; the pressure in the inside of the closed vessel 32 was reduced to about 20 Torr by a pressure reducing pump 40; and the reduced pressure state was held for the same time (first prescribed time) as that in Example 2-1 while actuating the vibrator 46. After a lapse of the first prescribed time, the inside of the closed vessel 32 was returned to atmospheric pressure, and curing was performed in the same manner as that in from Step S58 to Step S62 of Example 2-1, thereby obtaining a specimen for test at a material age of 21 days. Thereafter, the compression strength was measured in the same method as that in Example 2-1. As a result, the compression strength was found to be 167.1 MPa (an average value of the three specimens for test).

Comparative Example 2-3

As Comparative Example 2-3, the same concrete as that used in the foregoing Example 2-1 was cast into the inside of the shuttering 34 and installed in the inside of the closed vessel 32; thereafter, the vibrator 46 was actuated at atmospheric pressure as it was; and irradiation with a microwave was performed for the same irradiation time t as that in Example 2-1 while driving the turntable 48.

Subsequently, the air valve 44 was closed to make the closed vessel 32 airtightness, and the inside of the closed vessel 32 was held in a reduced pressure state by the pressure reducing pump 40 for the same time (second prescribed time) as that in the reduced pressure state after stopping the irradiation with a microwave in Example 2-1. Subsequently, the inside of the closed vessel 32 was returned to atmospheric pressure, and curing was performed in the same manner as that in from Step S58 to Step S62 of Example 2-1, thereby obtaining a specimen for test at a material age of 21 days. Thereafter, the compression strength was measured in the same method as that in Example 2-1. As a result, the compression strength was found to be 126.2 MPa (an average value of the three specimens for test).

From the results of the foregoing Example 2-1 and Comparative Examples 2-1 to 2-3, it was confirmed that when the second production method of the present invention is applied, a concrete formed body having remarkably high compression strength can be obtained for a short period of time as compared with the conventional irradiation with a microwave.

Embodiment 3

Experimental examples corresponding to the third production method of the present invention are described.

Example 3-1

Figure 6:
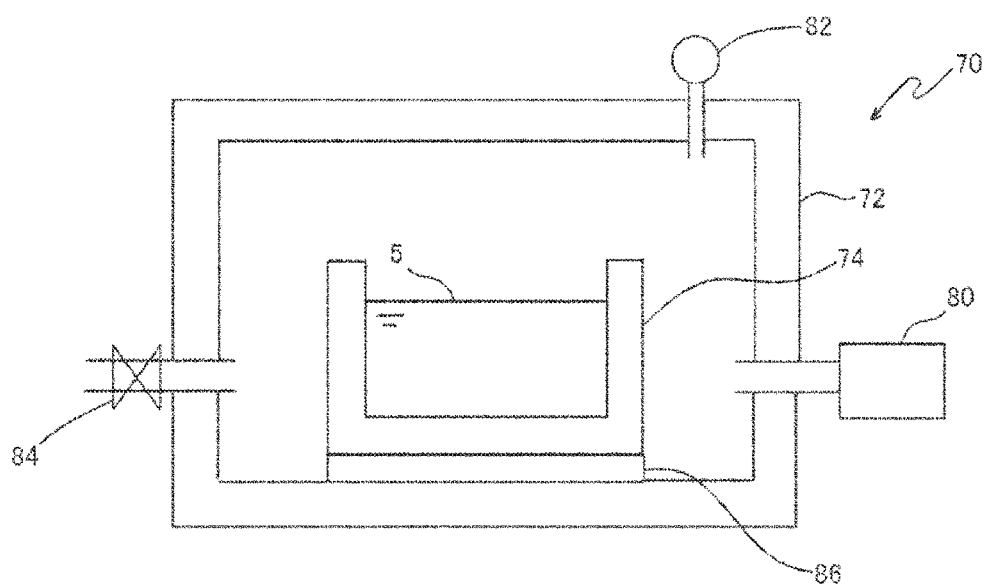
FIG. 6 is a diagrammatic view of an apparatus used in the Examples of a third production method of the present invention.

An apparatus shown in FIG. 6 was prepared. An apparatus 70 shown in FIG. 6 is constructed of a closed vessel 72, a pressure reducing pump 80, and a vibrator 86. In addition, the closed vessel 72 is provided with a vacuum gauge 82 and an air valve 84. Here, a shuttering 74 having a concrete composition 5 placed therein can be installed in the closed vessel 72.

The closed vessel 72 has only to be able to hold a reduced pressure state of from about 5 to 15 Torr (in other words, it is also possible to hold a reduced pressure state having a degree of vacuum lower than 30 Torr, 40 Torr, and 60 Torr (namely, a reduced pressure state close to atmospheric pressure)), and a vessel made of a metal such as stainless steel, etc., glass, or the like can be used. In addition, it is possible to install in the inside of the closed vessel 72 the shuttering 74 having the concrete composition 5 cast thereinto. The closed vessel 72 is provided with an opening capable of holding the state of airtightness after installing the shuttering 74. Furthermore, the closed vessel 72 is connected with the pressure reducing pump 80, the vacuum gauge 82, and the air valve 84 and is constructed such that each of them is able to keep the state of airtightness. It is to be noted that in the case of using a container made of a metal such as stainless steel, etc. for the closed vessel 72, it is desirable to provide an observation window such that the state of the concrete composition 5 in the inside thereof can be observed.

The shuttering 74 has only to be a shuttering capable of placing the concrete composition 5 in the inside thereof, and a steel-made shuttering, a wood-made shuttering, and the like can be used. In the case of fabricating a precast product in the factory, a steel-made shuttering is desirable from the standpoint of costs.

The pressure reducing pump 80 is a pressure reducer and reduces the pressure within the closed vessel 72. As the pressure reducing pump 80, those of a type capable of being actuated from atmospheric pressure, such as a diaphragm pump, a rotary pump, etc., can be used. In addition, the pressure reducing pump 80 is not limited to the above-described pumps so long as it is a pressure reducer capable of performing the pressure reduction to an extent of from 5 to 15 Torr, and a variety of pressure reducers may be used.

The vacuum gauge 82 measures the pressure within the closed vessel 72. A mechanical pressure gauge such a Bourdon tube gauge, a diaphragm gauge, etc. can be used for the vacuum gauge 82. Other pressure gauges may also be used for the vacuum gauge 82 so long as they are able to measure a pressure of from atmospheric pressure to about 5 to 15 Torr.

The air valve 84 is a valve that is the so-called vacuum valve. The air valve 84 is closed when the inside of the closed vessel 72 is rendered in a reduced pressure state and opened when the pressure within the pressure-reduced closed vessel 72 is returned to atmospheric pressure.

The vibrator 86 is installed on the bottom within the closed vessel 72 and gives vibrations to the shuttering 74 installed on the vibrator 46. As the vibrator 86, a variety of vibration generators can be used, and for example, an electro-dynamic vibrator, a piezoelectric vibrator, a hydraulic vibrator, and the like can be used. In addition, an ultrasonic vibrator may also be used.

In addition, the apparatus 70 is provided with a stirring rod (not shown) capable of mixing by stirring a surface portion of the concrete composition 5 having been cast into the shuttering 74, and by operating this stirring rod from the outside of the closed vessel 72, it is possible to mix by stirring the surface portion of the concrete composition 5 having been cast into the shuttering 74. Furthermore, a sprayer for spraying water onto the surface of the concrete composition 5 may be provided.

A high-strength concrete was produced by using the apparatus 70. The production method is hereunder described according to a flow chart shown in FIG. 7.

First of all, the concrete composition 5 was placed, i.e., cast in the inside of the shuttering 74, and the shuttering 74 having the concrete composition 5 cast thereinto was installed on the vibrator 86 within the closed vessel 72 (Step S90).

Here, the concrete composition 5 is a composition (so-called mortar) obtained by thoroughly mixing the following cement, silica fume, silica sand, water reducing agent, and water.

Portland cement (model No.: ordinary Portland cement, manufactured by Taiheiyo Cement Corporation): 1,200 g Silica fume (model No.: MEYCO MS610, manufactured by BASF Pozzolith Ltd.): 120 g Silica sand (fine aggregate): silica sand No. 3: 330 g and silica sand No. 5: 330 g Water reducing agent (model No.: RHEOBUILD SP-8HU, manufactured by BASF Pozzolith Ltd.): 26.4 g Water (purified water): 237.6 g Water-cement ratio: 20%

It is to be noted that the foregoing were mixed to fabricate three cylindrical specimens for test each having a weight of 450 g.

Subsequently, after closing the air valve 84, the pressure reduction in the inside of the closed vessel 72 was started by the pressure reducing pump 80, and the inside of the closed vessel 72 was subjected to pressure reduction to an extent of about 20 Torr while confirming the pressure by the vacuum gauge 82 (Step S92).

Here, after reducing the pressure to a prescribed pressure, the vibrator 86 was actuated for the purpose of vibrating for a prescribed time (for example, about 10 minutes). According to this, it is possible to aerate the air entrained at the time of fabricating a concrete and to discharge a generated steam from the concrete. Thereafter, the vibrator 86 was stopped, the air valve 84 was opened, and the inside of the closed vessel 72 was returned to atmospheric pressure (Step S94).

Subsequently, the concrete composition 5 and the shuttering 74 were taken out from the closed vessel 72 and allowed to stand at room temperature for one day (Step S96). Thereafter, water curing was performed for 19 days (Step S98), thereby obtaining a specimen for test at a material age of 21 days.

Subsequently, the obtained specimen for test was measured for compression strength by using a fully automatic concrete compression testing machine, CONCRETO 2000 (manufactured by Shimadzu Corporation). As a result, the compression strength was found to be 151.6 MPa (an average value of the three specimens for test).

Comparative Example 3-1

Next, as Comparative Example 3-1, the same concrete composition as that used in the foregoing Example 3-1 was cast into the inside of the shuttering 74, and after allowing to stand at room temperature, water curing was performed to obtain a specimen for test at a material age of 21 days. Thereafter, the compression strength was measured in the same method as that in Example 3-1. As a result, the compression strength was found to be 114.6 MPa (an average value of the three specimens for test).

From the results of the foregoing Example 3-1 and Comparative Example 3-1, it was confirmed that when the third production method of the present invention is applied, a concrete formed body having remarkably high compression strength can be obtained for a short period of time.

REFERENCE SIGNS LIST

1, 3, 5: Concrete composition
10, 30, 70: Apparatus
12, 32, 72: Closed vessel
14, 16: Container
34, 74: Shuttering
20, 40, 80: Pressure reducing pump
22, 42, 82: Vacuum gauge
24, 44, 84: Air valve
36: Microwave generator
36a: Waveguide
37: Stirrer fan
38: Surface resistivity meter
39: Electrode
46, 86: Vibrator
48: Turntable

The invention claimed is:

1. A method for producing a concrete formed body comprising
   a first defoaming step of holding a concrete composition having a water-cement ratio adjusted to from 14 to 20%, in a reduced pressure atmosphere to obtain a defoamed concrete;
   a second defoaming step of holding a carbon fiber immersed in a cement solution having a water-cement ratio adjusted to 14% or more, in a reduced pressure atmosphere to obtain a defoamed fiber; and
   a forming step of placing the defoamed concrete and the defoamed fiber within a shuttering, followed by curing to obtain a high-strength concrete formed body.

2. The method for producing a concrete formed body according to claim 1, wherein the concrete composition further contains an organic synthetic fiber.

3. The method for producing a concrete formed body according to claim 1, wherein the carbon fiber does not have a water-repellent organic material on a surface thereof.

4. The method for producing a concrete formed body according to claim 1, wherein the concrete composition contains a chemical admixture and a mineral admixture.

5. The method for producing a concrete formed body according to claim 1, wherein a length of the carbon fiber is 30 mm or more.

6. The method for producing a concrete formed body according to claim 1, wherein in the second defoaming step, the carbon fiber is in a form of sheet-like woven fabric.

7. The method for producing a concrete formed body according to claim 1, wherein the first defoaming step is a step of determining an irradiation time of a microwave on the basis of the water-cement ratio at the time of fabricating the concrete composition and irradiating the concrete composition in the reduced pressure atmosphere with a microwave for the irradiation time to obtain the defoamed concrete.

* * * * *